(12) United States Patent
Dewan et al.

(10) Patent No.: US 9,514,551 B2
(45) Date of Patent: Dec. 6, 2016

(54) EFFICIENT FETCHING OF A MAP DATA DURING ANIMATION

(71) Applicant: GOOGLE INC., Mountain View, CA (US)

(72) Inventors: Maneesh Dewan, San Jose, CA (US); Tatsuo Nomura, Mountain View, CA (US); Zhaoyang Xu, Mountain View, CA (US); Paul Vincent Byrne, Los Altos, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/279,132

(22) Filed: May 15, 2014

(65) Prior Publication Data
US 2014/0340304 A1 Nov. 20, 2014

Related U.S. Application Data

(60) Provisional application No. 61/823,765, filed on May 15, 2013.

(51) Int. Cl.
*G06T 11/20* (2006.01)
*G06T 13/80* (2011.01)
(Continued)

(52) U.S. Cl.
CPC ............... *G06T 11/20* (2013.01); *G06F 3/017* (2013.01); *G06T 13/80* (2013.01); *G06T 17/05* (2013.01);
(Continued)

(58) Field of Classification Search
CPC .......... G06T 11/20; G06T 13/80; G06T 17/05; G06F 3/017; G06F 3/14
See application file for complete search history.

(56) References Cited

U.S. PATENT DOCUMENTS 6,115,611 A * 9/2000 Kimoto ................. G01C 21/26
455/456.3
8,457,653 B2 6/2013 Ledlie
(Continued)

FOREIGN PATENT DOCUMENTS

EP 1 450 277 A2 8/2004
WO WO-2012/072862 A1 6/2012

OTHER PUBLICATIONS

Weber, "Mobile Map Browsers: Anticipated User Interaction for Data Pre-Fetching," The University of Maine Electronic Theses and Dissertations (2010).
(Continued)

*Primary Examiner* — Liliana Cerullo
(74) *Attorney, Agent, or Firm* — Marshall, Gerstein & Borun LLP

(57) ABSTRACT

A first digital map is displayed in a viewport at an initial position. When a user gesture that communicates motion to the viewport is detected, a trajectory of the viewport from the initial position to a target position is determined based on kinematic quantities of the communicated motion. Map data for displaying a second digital map in the viewport at the target position is retrieved from a first memory, prior to the viewport reaching the target position. The retrieved map data is stored in a second memory having a higher speed of access than the first memory. The second memory is retrieved for display via the user interface when the viewport is at the target position.

19 Claims, 7 Drawing Sheets

(51) Int. Cl.
*G06T 17/05* (2011.01)
*G06F 3/01* (2006.01)
*G09G 5/34* (2006.01)
*G09G 5/393* (2006.01)
*G09G 5/36* (2006.01)

(52) U.S. Cl.
CPC ............... *G09G 5/34* (2013.01); *G09G 5/393* (2013.01); *G09G 5/363* (2013.01); *G09G 2360/121* (2013.01)

(56) References Cited

U.S. PATENT DOCUMENTS

| | | |
|---|---|---|
| 2007/0055441 A1 | 3/2007 | Retterath et al. |
| 2009/0281718 A1 | 11/2009 | Gibran et al. |
| 2009/0319181 A1* | 12/2009 | Khosravy et al. ............ 701/208 |
| 2011/0306304 A1 | 12/2011 | Forutanpour et al. |
| 2012/0062602 A1 | 3/2012 | Vadhavana et al. |
| 2012/0157122 A1 | 6/2012 | Niranjan et al. |
| 2013/0208012 A1 | 8/2013 | Ergan et al. |
| 2013/0321472 A1* | 12/2013 | Piemonte et al. ............ 345/672 |

OTHER PUBLICATIONS

European Search Report for Application No. 14167939.9, dated Jun. 19, 2015.

* cited by examiner

EFFICIENT FETCHING OF A MAP DATA DURING ANIMATION

CROSS-REFERENCE TO RELATED APPLICATION

This application claims priority to U.S. Provisional Patent Application No. 61/823,765, filed on May 15, 2013 and titled "Efficient Fetching of Map Data During Animation," the entire disclosure of which is hereby expressly incorporated by reference herein.

FIELD OF TECHNOLOGY

The present disclosure relates generally to displaying interactive digital maps and, more particularly, retrieving map data during animation in response to a user gesture or other input.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Software applications that display interactive digital maps on touchscreen devices can receive single- and multi-finger gestures as input. For example, a user can move the viewport in which a digital map is being displayed by "dragging" the map, or zoom in and out by moving two fingers farther apart or closer together, respectively. Some user gestures, such as "fling," communicate motion to the viewport in a certain direction and with a certain acceleration. When such gestures are detected, these software applications may "animate" the digital map to create the sense of the viewport following a certain trajectory to the target position. The viewport in some cases follows the trajectory quickly, covering large portions of the digital map over a very brief period of time.

SUMMARY

A digital mapping module operating in a computing device fetches map data for future positions of a viewport to which the user communicates motion, thereby reducing latency and making viewport "animation" appear smooth and seamless. To determine future positions of the viewport, the mapping module can detect a touchscreen gesture (such as fling) that communicates motion to the viewport in a certain direction and with a certain acceleration, for example. The mapping module can calculate the probable trajectory of the viewport as the user's finger leaves the screen and fetch map data for the end point of the trajectory and, in some cases, for intermediate positions of the viewport along the trajectory, before the viewport reaches these positions. Depending on the implementation, the mapping module can fetch map data from a persistent storage (e.g., flash drive) to the cache of the rendering pipeline (e.g., GL cache), from a network server to a local memory on the computing device, etc. The mapping module also can dynamically vary the level of detail for different positions of the viewport along the trajectory. Thus, for example, map data fetched for the position at the end of the trajectory includes relatively detailed data, map data fetched for positions where the speed of the viewport is at its highest includes information for only major geographic features, and map data fetched for other positions along the trajectory includes information for major as well as for some minor geographic features, but in any case less than the information fetched for the end of the trajectory.

More particularly, one embodiment of these techniques is a method for efficiently fetching digital map data displayed in a viewport. The method includes displaying, via a user interface, a first digital map in a viewport at an initial position. The method further includes detecting a user gesture that communicates motion to the viewport, determining a trajectory of the viewport from the initial position to a target position based on kinematic quantities of the communicated motion, and retrieving, from a first memory, map data for displaying a second digital map in the viewport at the target position, prior to the viewport reaching the target position. Still further, the method includes storing the retrieved map data in a second memory having a higher speed of access than the first memory and retrieving the map data from the second memory for display via the user interface when the viewport is at the target position.

Another embodiment of these techniques is a computing device including a user interface configured to receive gesture input, rendering hardware configured to generate graphics content via a user interface, a non-transitory memory coupled to the rendering hardware, and processing hardware. The processing hardware is configured to cause the rendering hardware to display, via the user interface, a digital map in a viewport at an initial position. In response to a gesture communicating motion to the viewport via the user interface in a certain direction and with a certain acceleration, the processing hardware is configured to determine a trajectory of the viewport from the initial position to a target position, obtain map data for generating respective digital maps at one or more positions of the viewport along the trajectory, prior to the viewport reaching the one or more positions, and transfer the map data to the memory, where the rendering hardware retrieves the map data from the memory when rendering the digital maps at the corresponding one or more positions of the viewport.

Yet another embodiment is a system for rendering digital maps. The system includes a user interface configured to receive gesture input, rendering hardware, processing hardware, a first memory accessible by the rendering hardware, and a second memory not directly accessible by the rendering hardware, where the second memory stores map data for rendering digital maps. The processing hardware is configured to cause the rendering hardware to display, via the user interface, a first digital map in a viewport at an initial position; in response to a gesture communicating motion to the viewport via the user interface in a certain direction and with a certain acceleration, determine a trajectory of the viewport from the initial position to a target position; transfer, from the second memory to the first memory, map data for generating a second digital map in the viewport at the target position, prior to the viewport reaching the target position; and when the viewport reaches the target position, cause the rendering hardware to display the second digital map using the map data in the first memory.

DETAILED DESCRIPTION

In response to a fling gesture or similar user action, a viewport may quickly "fly" over a digital map and cover multiple geographic areas in quick succession. To represent these geographic areas on a digital map accurately and efficiently, the client device determines a trajectory the viewport will follow its the current position to a new position. The client device then fetches, from a local or remote storage with a relatively low speed of access to a faster memory, map data for rendering a digital map along the trajectory, before the viewport reaches positions corresponding to this map data. As a result, the animation incurs minimal latency while the client device displays accurate geographic data in the moving viewport.

Further, the client device can dynamically vary the level of detail for the map data visible in the viewport at different sections of the trajectory. For example, upon determining the trajectory, the client device can request more details for the area where the viewport will come to rest, and less detail for the areas where the viewport will be merely in transit.

Figure 1:
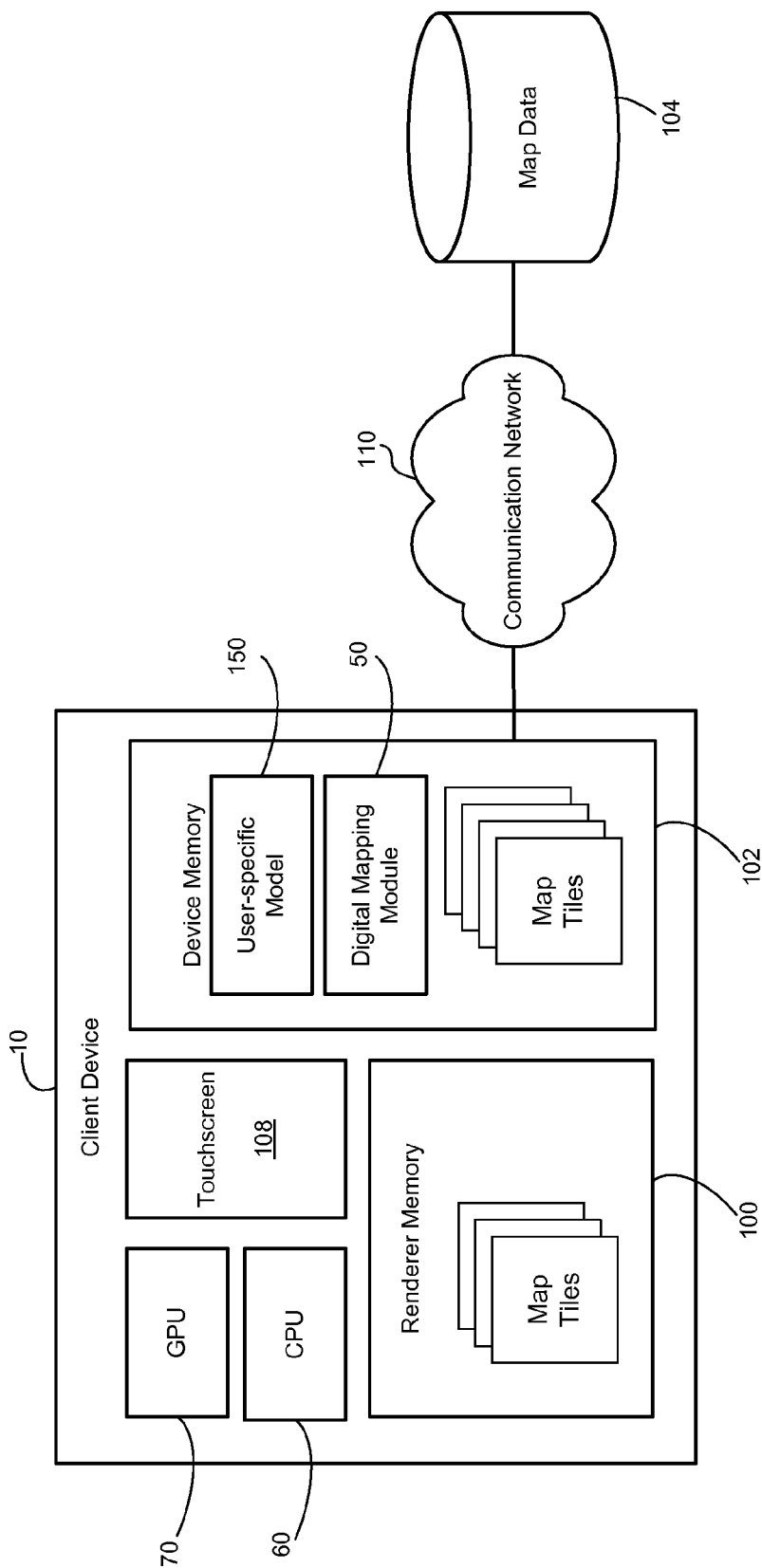
FIG. 1 illustrates an example computing environment in which a software application can fetch map data during animation of viewport movement.

More particularly, FIG. 1 illustrates an example environment including a client device 10, in which a digital mapping software module (for simplicity, "mapping module") 50 can implement the fetching techniques of this disclosure. The client device 10 can include one or more general-purpose processors, such as a CPU 60, and one or more graphics processors, such as a GPU 70. Depending on the implementation, the general-purpose processing hardware (e.g., the CPU 60) and rendering hardware (e.g., the GPU 70) can be provided as a single chipset or as separate components or cards. The mapping module 50 can include instructions executable as a special-purpose application or as an extension/plugin or script in a web browser (not shown), for example. The mapping module 50 can execute on the one or more general-purpose processors and the one or more graphics processors of the client device 10.

The client device 10 can include a memory 100, from which the rendering hardware of the client device 10 can retrieve data relatively quickly. The client device 10 also can include a memory 102, from which the rendering hardware either cannot retrieve data directly or cannot retrieve data as quickly as from the memory 100. In other words, the memory 100 has a higher speed of access for rendering purposes than the memory 102. The memory 100 is referred to below as "renderer memory" 100. As one example, the memory 100 is a cache or set of buffers implemented in a rendering pipeline, such as GL cache, of the graphics card including the GPU 70. On the other hand, the memory 102, referred to below as "device memory," stores data primarily for access by the CPU 70. The memory 102 can include persistent memory components (such as flash or hard disk) and/or non-persistent memory such as random-access memory (RAM), for example. More generally, the client device 10 can include any suitable number of memory components that implement multiple tiers of access.

The client device 10 further includes a touchscreen 108 via which the mapping module 50 can receive input, including gesture input, and display digital maps. Moreover, in other implementations, the client device 10 can detect two- or three-dimensional gestures using a video camera or suitable sensors. In general, the client device 10 can detect and process kinematic quantities of user motion in any suitable manner to determine in what direction, and how quickly, a viewport should be repositioned on a digital map.

In operation, the mapping module 50 processes gesture input to determine the probable trajectory of the viewport, determines what map data will be needed in view of the trajectory, and fetches map data into the renderer memory 100 from the device memory 102 or other memory internal or external to the client device 10. The map data can be organized into "map tiles" corresponding to geographic units of fixed, zoom-specific size. When the necessary map data is not available in the device memory 102, the mapping module 50 fetches map tiles from a map data repository 104 via a communication network 110, which can be the Internet or any other suitable wide- or local-area network. A digital mapping service, including any suitable number of servers (not shown), can operate the map data repository 104 to provide map data in response to requests from client devices.

As further illustrated in FIG. 1, the mapping module 50 may store a user-specific model 150 to more accurately determine which map tiles should be fetched. The mapping module 50 may train and update the model 150 based on the current user's profile, historical data, etc. (in some embodiments, the user operates certain controls and/or installs certain applications to configure the mapping module 50 to apply the user's data in this manner). For example, based on how the user typically pans the viewport (e.g. how fast, with what acceleration, whether the user communicates motion with one strong flick or multiple softer flings, whether the user tends to abruptly stop the viewport in motion), the mapping module 50 can estimate where the viewport will end up in response to a detected gesture. In general, the software application 50 may estimate the trajectory or target position of the viewport based on any number of kinematic quantities representative of viewport motion and/or past user gestures, such as acceleration, velocity, force, momentum, time, etc.

Further, the mapping module 50 in some implementations can use the user-specific model 150 to predict user's gesture and fetch the corresponding map tiles. For example, the mapping module 50 can iteratively adjust the user-specific model 150 in view of detected user gestures and, upon determining contact with the touchscreen 108 but prior to fully recognizing the gesture, identify a probable user gesture and the associated kinematic quantities (e.g., acceleration, direction), determine a viewport trajectory corresponding to the probable user gesture, and fetch map tiles for the endpoint of the trajectory and/or along the trajectory. Thus, when a certain user often communicates motion to the viewport with a similar gesture, such as a soft fling to the right, the mapping module 50 can fetch map tiles in accordance with this gesture before being able to confirm that the user is in fact making the gesture.

In addition to map data, the mapping module 50 may fetch data from additional map data layers. For example, the mapping module 50 in some scenarios fetches data related to businesses in the geographic area. Further, if the user recently submitted a request for a geographic query (e.g., "gas stations nearby"), the mapping module 50 may automatically re-execute the query for the destination area (and, if desired, the transitional area), receive the results, and display these results if and when the viewport reaches the locations to which these results correspond. More particularly, the mapping module 50 may display indicators at the locations corresponding to the search results. In another example, the mapping module 50 may fetch data related to current traffic conditions, weather conditions, and/or public transit information to be rendered as an additional data layer.

Figure 2:
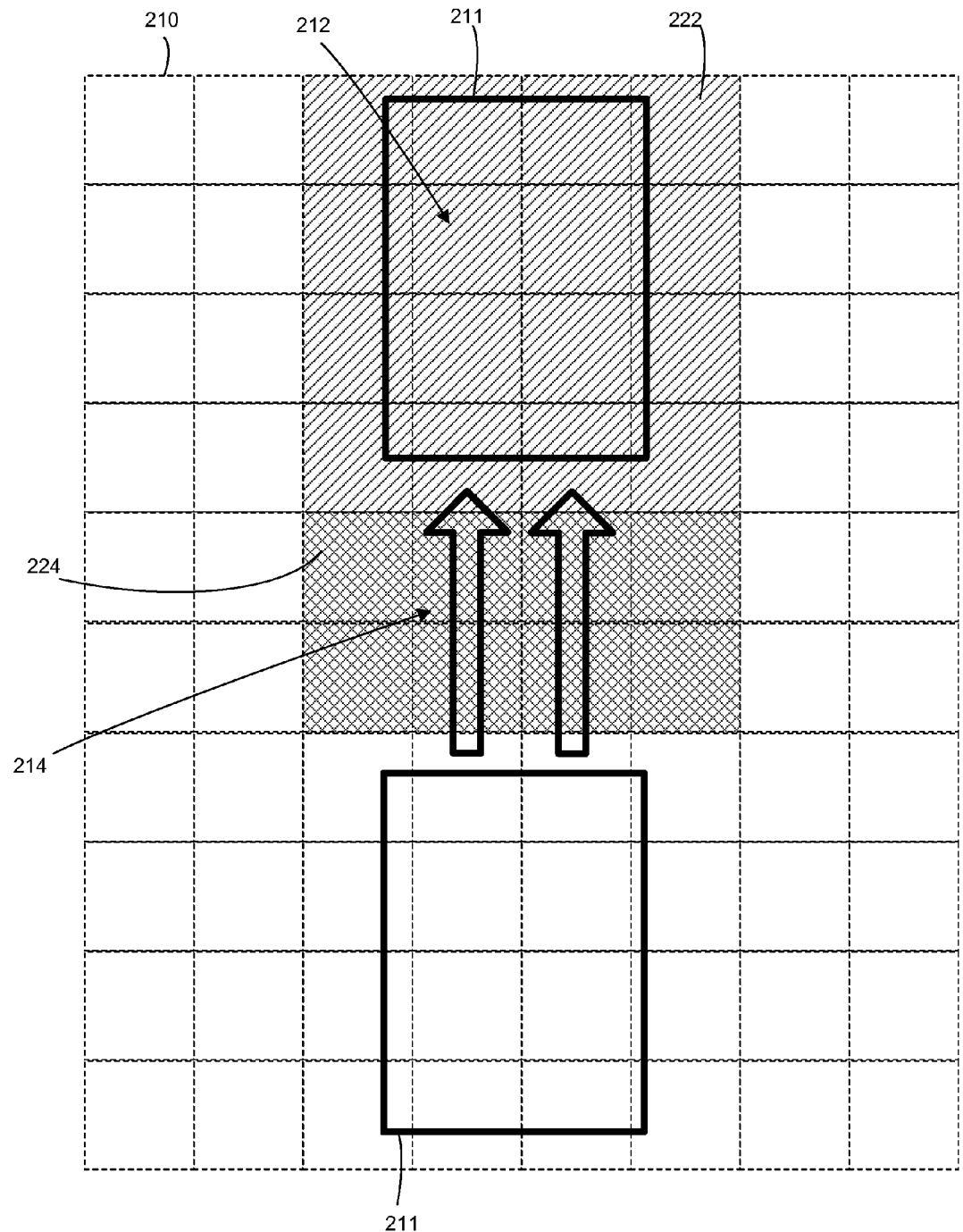
FIG. 2 schematically illustrates an example trajectory of a viewport when a user "flings" the digital map, as well as map tiles visible in the viewport during and after fling animation.

FIG. 2 schematically illustrates how the mapping module 50 can display portions of an interactive digital map 210 and animate movement of a viewport 211 from its current position to a relatively far removed target position. The direction of movement of the viewport 211 is illustrated in FIG. 2 with arrows. The mapping module 50 may animate the movement when the user flings the viewport with a finger gesture. More particularly, the mapping module 50 can gradually advance the viewport toward the target position and depict portions of the digital map 210 covered by the viewport in its intermediate positions. Before, or as, the movement of the viewport begins, the mapping module 50 determines the trajectory of the viewport 211 and fetches map data for the destination area 212 that will be visible in the viewport at its target position. Also, in some implementations, the mapping module 50 also pre-fetches map data for the transitional area 214 disposed along the projected trajectory of the viewport. In this manner, the mapping module 50 efficiently uses the time spent on animation to retrieve map data the mapping module 50 will likely need (unless the user abruptly stops or reverses the movement of the viewport). The latency in retrieving and drawing new user map data is thereby reduced, and the user accordingly sees quicker, smoother transitions between different generations of the viewport.

In some implementations, the mapping module 50 fetches map data in the form of tiles, i.e., portions of a digital map of a fixed size, which is constant for a certain zoom level. The map tiles may include vector graphics data rendered at the client device, raster (bitmap) data, or both. Further, map tiles, in some cases, include definitions and/or positions of labels that can be rendered independently of the other map data and may be overlaid on the digital map. In FIG. 2, the geographic area 212 is covered by map tiles 222, and the geographic area 214 is covered by map tiles 224. In general, however, map data can be organized into smaller units according to any suitable principles.

In some cases, the mapping module 50 fetches map tiles differently for the destination area than for the transitional area. For example, the software application 50 may fetch complete definitions of map tiles in the destination area and fetch only partial definitions of map tiles in the transitional area, as the user will see these map tiles only in passing. As a more specific example, the mapping module 50 can fetch only some or all of the following for the map tiles in the transition area: (i) geometry of major roads (with smaller roads and streets omitted from the map data), (ii) all or some of the labels (which can be rendered independently of other map content, as discussed above), and (iii) map elements in a vector format that have large footprint, omitting the elements with small footprints. More generally, the mapping module 50 can select geographic features from the complete definition of tiles for the transitional area according to prominence of features, importance of features, type of features, etc.

As another alternative, the mapping module 50 may fetch map tiles for the transitional area at a different zoom level, and therefore with lower level of detail, than for the destination area.

Although the examples of this disclosure focus primarily on the fling gesture with which the user pans a viewport, in general the software application 50 may apply the fetching techniques of this disclosure to any suitable gesture and even to non-gesture based animation. Thus, for example, the mapping module 50 may fetch tiles when the user begins a pinching gesture or to decrease the zoom level or a (and therefore cover a larger geographic area with the viewport). As another example, the mapping module 50 may detect a double-tap gesture via which the user zooms in on an area (and therefore the viewport will cover map tiles at a new zoom level). In other words, the mapping module 50 may fetch tiles for new geographic areas, for the same geographic areas at a different zoom level, or both.

As an example of non-gesture-based animation, the user may request that the viewport "fly over" to a new location. To this end, the user may enter a new destination in a search field. The software application 50 may fetch tiles as the destination is being confirmed, as the animation begins, or at any other suitable time when the destination and transitional areas may be determined with a sufficient degree of certainty.

Next, FIG. 3A-3D illustrate an example scenario in which a user operates the mapping module 50 to communicate motion to a viewport 300 (e.g., via a fling motion from left to right as illustrated by an arrow 302) when viewing a digital map 304 in the viewport 300, and the mapping module 50 fetches map data in response to detecting the gesture.

Figure 3A:
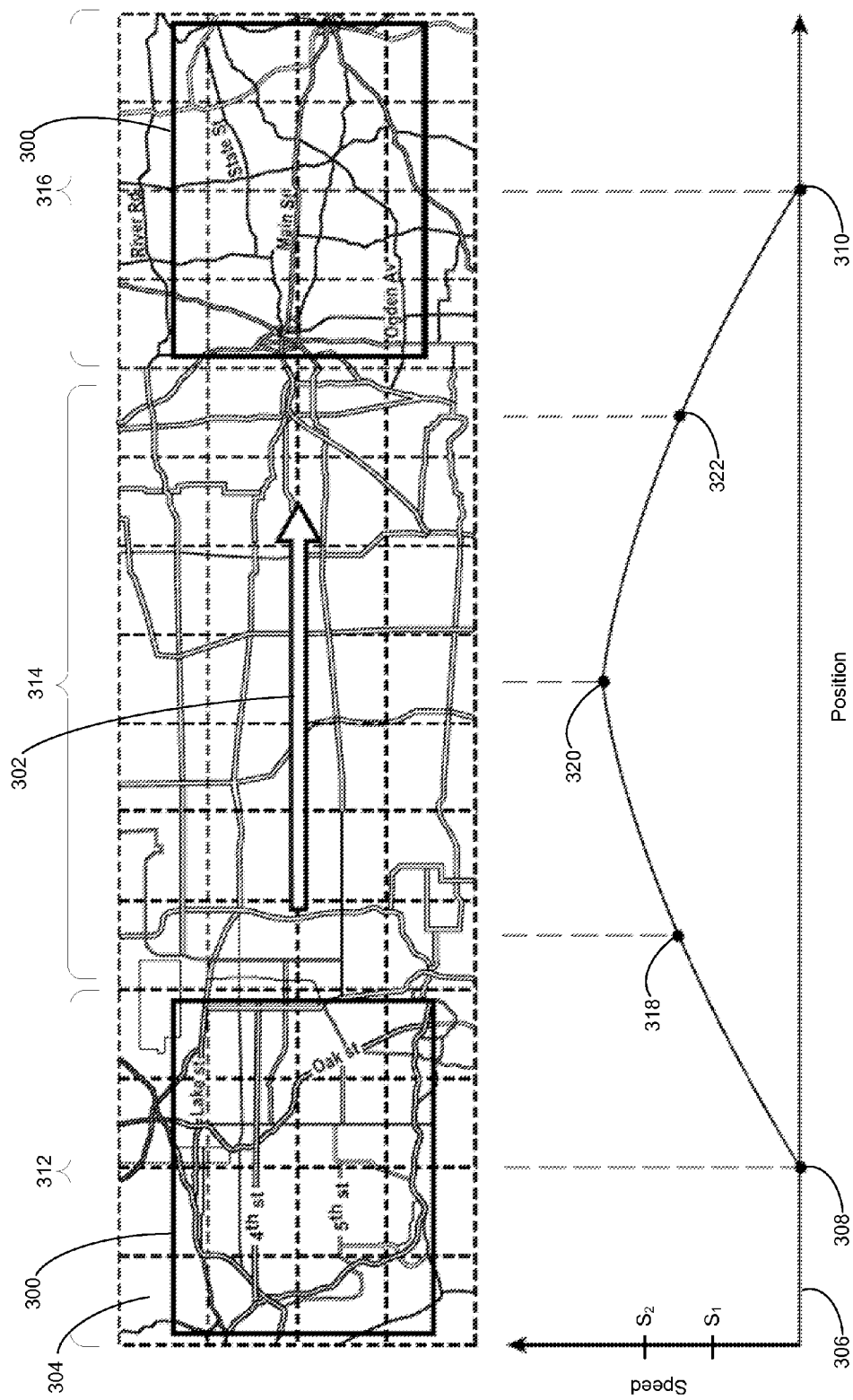
FIGS. 3A-3D illustrate an example scenario in which a user flings a digital map as illustrated in FIG. 2, and a client device retrieves map tiles at various zoom levels.

FIG. 3A illustrates the trajectory of the viewport 300 from an initial position to a target position and various map tiles retrieved before or during an animation of the viewport 300 from the initial position to the target position. Based on the user gesture and/or past user gesture history, the mapping module 50 may determine the trajectory of the viewport 300 from the initial position to the target position. The operating system of the client device may report various kinematic quantities associated with the gesture, such as speed, acceleration, position, etc. to the mapping module 50, and the mapping module 50 may calculate the trajectory and, if desired, the speed of the viewport 400 at different parts of the trajectory. For example, the speed of the viewport may change, as illustrated by the plot 306, as the viewport 300 moves along the trajectory from an initial position 308 to a target position 310. In some implementations, the client device may calculate a discrete number of values (e.g., time series) corresponding to one or more kinematic quantities to represent the trajectory, and, in other implementations, the client device may generate one or more mathematical or symbolic expressions representing the trajectory.

In the example scenario illustrated in FIG. 3A, the mapping module 50 can display an initial set of map tiles 312 within the viewport 300, at the initial position 308. The initial set of map tiles 312 may be completely defined. That is, the initial set of map tiles 312 may include all data layers, labels, features, etc. displayed during normal operation of a mapping application for a stationary viewport at a certain zoom level, in an implementation.

After a user gesture is received (communicating motion to the viewport 300), the mapping module 50 may calculate the trajectory of the viewport 300 and may retrieve one or more transitional map tiles 314 and one or more destination map tiles 316 before and/or during animation of the viewport 300. As further described above, the transitional map tiles 314 may be less defined as compared with the destination map tiles 316. In the scenario, the transitional map tiles 314 may include fewer labels, map features (e.g., roads), etc. as compared with the destination map tiles 316 or the initial set of map tiles 312.

In some implementations, the mapping module 50 may determine a level of definition at which to retrieve the transitional map tiles 314 based on the one or more kinematic quantities representing the trajectory of the viewport 300. In the example scenario, the mapping module 50 may determine the level of definition of the transitional map tiles 314 based on a comparison of the speed of the viewport 300 at points along the trajectory, as represented by the plot 306, to one or more threshold values $S_1$ and $S_2$.

As the viewport speeds up from the initial position 308 to a first intermediate position 318 along the trajectory, the speed of the viewport passes (i.e., becomes greater than) the threshold $S_1$. The speed of the viewport 300 may continue to increase until it reaches a maximum speed, greater than the threshold $S_2$, at a midpoint 320. The speed of the viewport 300 may then drop below the threshold $S_2$ as the viewport reaches a second intermediate position 322 and eventually drop below threshold $S_1$ as the viewport 300 reaches the target position 310. At positions along the trajectory below threshold $S_1$, the mapping module 50 may retrieve map tiles at a normal, or high, level of definition. At positions corresponding to speeds above the threshold $S_1$ and below the threshold $S_2$, such as the first and second intermediate positions 318 and 322, the mapping module 50 may retrieve map tiles at a level of definition lower than the normal level of definition (e.g., fewer labels and roads). Further, at positions corresponding to speeds above the threshold $S_2$, such as the midpoint 320, the mapping module 50 may retrieve map tiles at a lowest level of definition.

In general, the mapping module 50 may retrieve map tiles of various levels of definition based on any suitable assessment or evaluation of kinematic quantities representing a viewport trajectory. For example, mapping module 50 may retrieve map tiles of various levels of definition based on an evaluation involving any number of threshold values. Moreover, although the FIG. 3A illustrates one specific kinematic quantity (speed) changing as a function of position, a client device may represent and evaluate a trajectory based on any number of kinematic quantities, each kinematic quantity a function of any suitable dependent variable (position, time, etc.) and each kinematic quantity changing in any suitable manner along the trajectory (e.g., increasing, decreasing, or remaining constant).

Figure 3D:
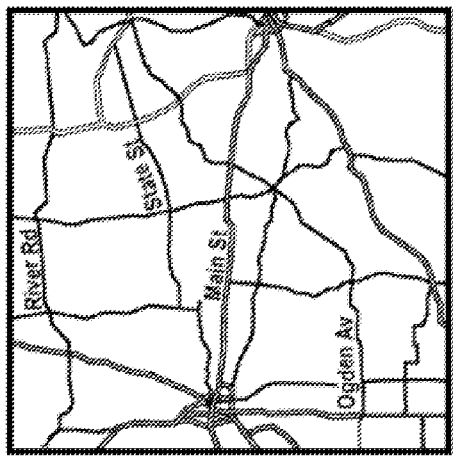
Figure 3C:
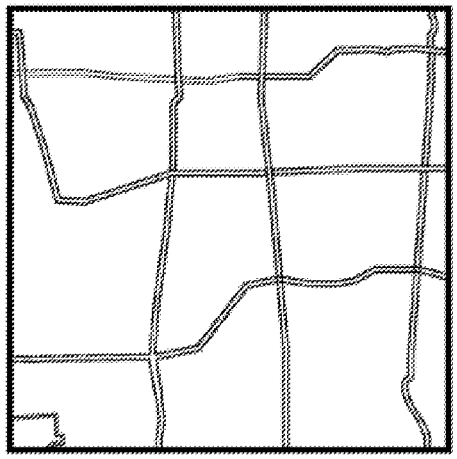
Figure 3B:
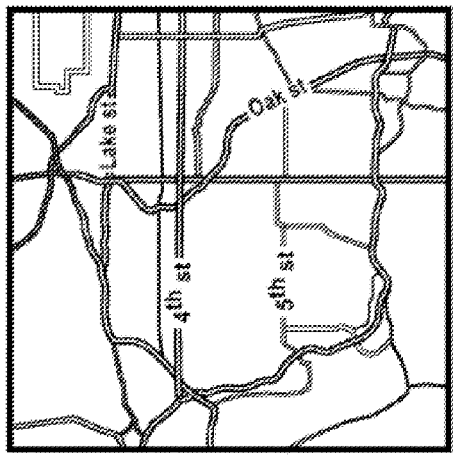

As the viewport 300 moves from the initial position 308 to the target position 310, the mapping module 50 may display the digital map 304 in the viewport based on the transitional map tiles 314 and the destination map tiles 316. For clarity, FIGS. 3B-3D illustrate the digital map 304 being displayed in the viewport 300 at: (i) the initial position 308; (ii) the midpoint position 320; and (iii) the target position 310, respectively.

For further clarity, FIG. 4A-4D illustrate another example scenario in which a user operates the mapping module 50 to communicate motion to a viewport 400 (e.g., via a fling motion from left to right as illustrated by an arrow 402) when viewing a digital map 404 in the viewport 400.

Figure 4A:
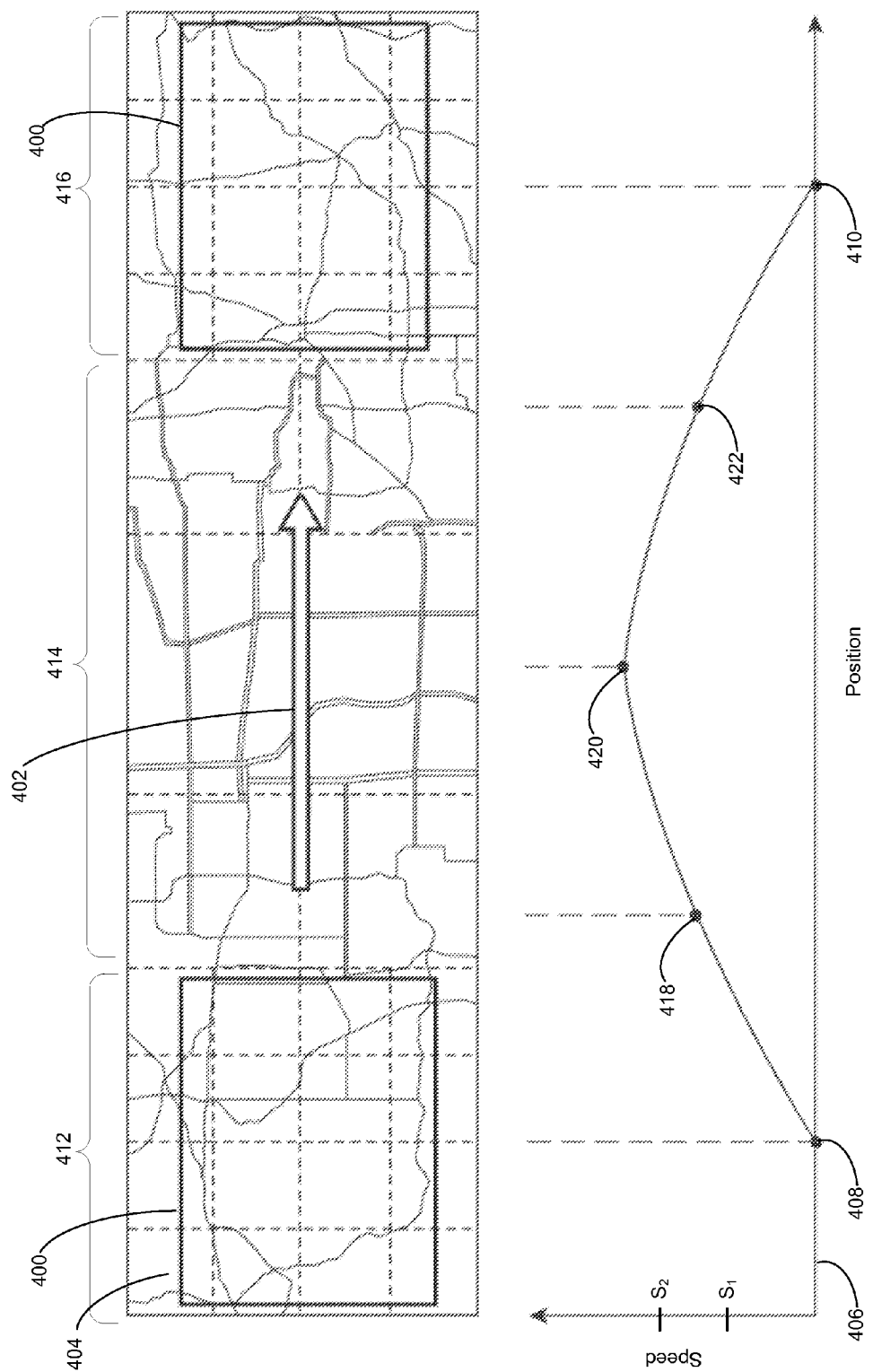
FIGS. 4A-4D illustrate another example scenario in which a user communicates motion to a viewport, such as when a user flings a digital map as illustrated in FIG. 2, and a client device retrieves map tiles at various levels of detail.

FIG. 4A illustrates the trajectory of the viewport 400 from an initial position to a target position and various map tiles retrieved before or during an animation of the viewport 400 from the initial position 408 to the target position 410. In the example scenario illustrated in FIG. 4A, the mapping module 50 may display an initial set of map tiles 412 within the viewport 400 at the initial position. The initial set of map tiles 412 may be at a normal or standard level of detail. That is, the initial set of map tiles 412 may include map data (features, labels, etc.) displayed at a level of detail corresponding to normal operation of a mapping application for a stationary viewport at a certain zoom level, in an implementation.

After a user gesture is received (communicating motion to the viewport 400), the mapping module 50 may determine the trajectory of the viewport 400 and retrieve one or more transitional map tiles 414 and one or more destination map tiles 416 before and/or during animation of the viewport 400. The transitional map tiles 414 may be at a different level of detail as compared with the destination map tiles 416 and/or the initial set of map tiles 412. In this scenario, the transitional map tiles 414 may include map tiles corresponding to a higher zoom level (i.e., a zoom level further away from the displayed geographic area) and map tiles with larger dimensions than the destination map tiles 316.

Similar to the example scenario illustrated in FIG. 3A-3D, the mapping module 50 may determine the level of detail of the transitional map tiles 414 based on a comparison of the speed of the viewport 400 at points along the trajectory, as represented by the plot 406, to one or more threshold values $S_1$ and $S_2$. However, the mapping module 50 also may utilize any suitable analysis of kinematic quantities corresponding to the trajectory to determine levels of detail of retrieved map tiles.

Figure 4D:
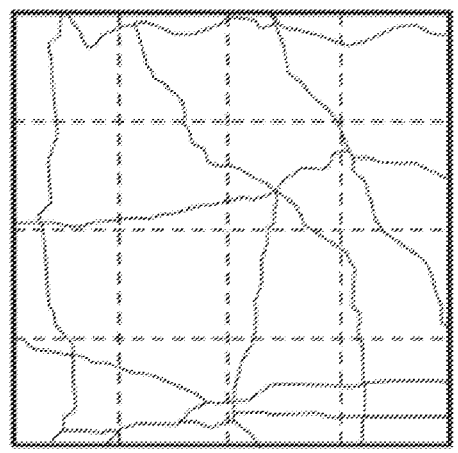
Figure 4C:
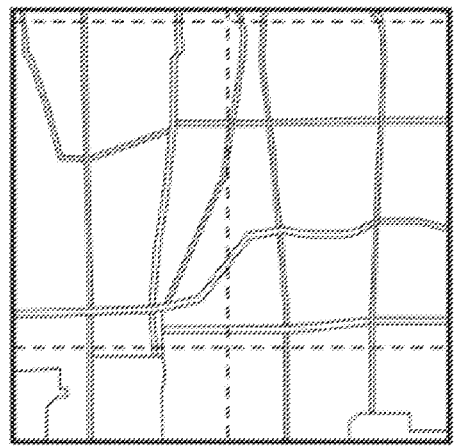
Figure 4B:
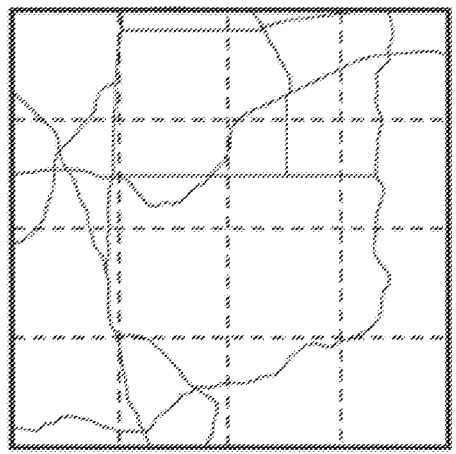

As the viewport 400 moves from the initial position 408 to the target position 410, the mapping module 50 may display the digital map 404 in the viewport based on the transitional map tiles 414 and the destination map tiles 416. For clarity, FIGS. 4B-4D illustrate the digital map 404 displayed in the viewport 400 at: (i) the initial position 408; (ii) the midpoint position 420; and (iii) the target position 410, respectively.

Figure 5:
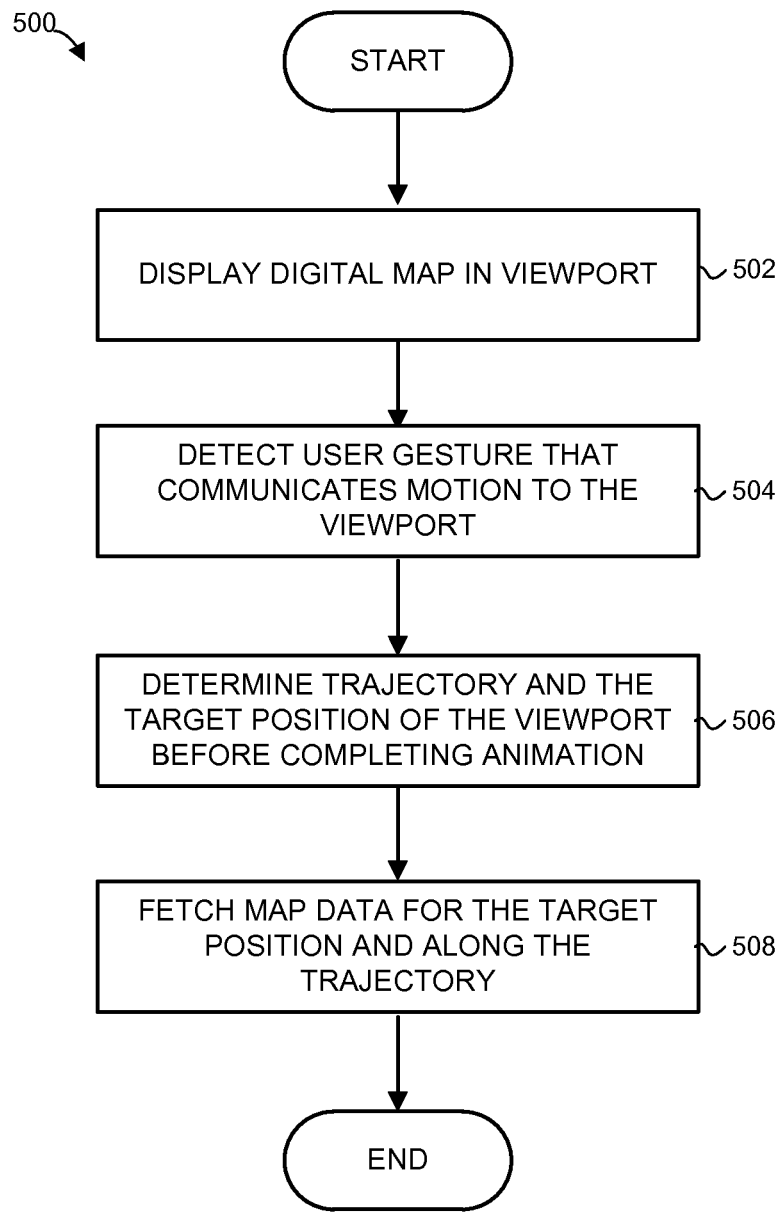
FIG. 5 is a flow diagram of an example method for prefetching map data upon detecting a gesture and before the animation for the gesture is completed.

An example method 500 which the mapping module 50 may implement to fetch map data is illustrated in FIG. 5.

At block 502, a digital map is displayed in a viewport. A software application, such as software application 50, may display a digital map in response to a geographic query, for example, where the initial viewport may be defined by the geographic query.

At block 504, a user gesture, communicating motion to the viewport, is detected. The user gesture may be detected using any suitable user interface, such as a touchscreen, trackball, mouse, keyboard, motion sensing device, etc., for example.

At block 506, a trajectory and target position of the viewport is determined before completing viewport motion animation. In some implementations, the mapping module 50 may calculate an acceleration of the viewport based on a fling or swipe gesture. For example, the mapping module 50 may use the position of the finger of a user, on a touchscreen, for example, as a function of time to calculate a viewport acceleration, and thus a trajectory of viewport motion. The end point of the viewport motion (i.e. where the viewport accelerates back to a stop) may be the target location of the viewport.

Next (block 508), map data is fetched for the target position of the viewport and for positions along the trajectory. For example, before the movement begins, or as the movement starts, the mapping module 50 may fetch map data for the destination area and/or for the transitional area, as further described with reference to FIG. 1.

In some implementations, after block 508, movement-specific map content may be displayed during movement of the map viewport. For example, the mapping module 50 may display map tiles, labels, additional data layers, etc. in the transitional area as the viewport is moving to the destination area. Moreover, the mapping module 50 may display fetched map data, corresponding to the destination area, when a viewport has fully or partially reached the destination area.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for efficient fetching of map data during animation through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method for efficiently fetching digital map data displayed in a viewport, the method comprising:
    displaying, via a user interface, a first digital map when a viewport is at an initial position corresponding to a first geographic area, the viewport defining a currently visible portion of a digital map;
    detecting, by one or more processors via the user interface, a fling gesture that communicates motion to the viewport;
    determining, by the one or more processors, a trajectory of the viewport from the initial position to a target position corresponding to a second geographic area, based on kinematic quantities of the communicated motion, wherein the trajectory includes a plurality of intermediate positions of the viewport along a path from the initial position to the target position;
    prefetching, by the one or more processors from a first memory, map data for displaying a second digital map in the viewport at the second geographic area corresponding to the target position prior to the viewport reaching the target position, wherein the retrieved map data for the second geographic area is displayed when the viewport has reached the target position;
    storing, by the one or more processors, the prefetched map data in a second memory having a higher speed of access than the first memory; and
    retrieving, by the one or more processors, the prefetched map data from the second memory for display via the user interface when the viewport is at the target position.

2. The method of claim 1, further comprising:
    prefetching, by the one or more processors from the first memory, map data for displaying respective digital maps in the viewport at the plurality of intermediate positions, before the viewport reaches the intermediate positions.

3. The method of claim 2, wherein prefetching the map data includes:
    prefetching first map data corresponding to the target position of the viewport at a first level of detail, and
    prefetching second map data corresponding to the plurality of intermediate positions of the viewport at a second level of detail,
    wherein the first level of detail is higher than the second level of detail.

4. The method of claim 3, wherein the first level of detail at a certain zoom level includes city streets, and the second level of detail at the same zoom level does not include city streets.

5. The method of claim 1, further comprising:
    determining, by the one or more processors, a respective speed of the viewport at a plurality of segments of the trajectory, and retrieving, by the one or more processors, map data corresponding to a first one of the plurality of segments at a first level of detail when the speed at the first one of the plurality of segments is below a certain threshold, and retrieving, by the one or more processors, map data corresponding to a second one of the plurality of segments at a second level of detail when the speed at the second one of the plurality of segments is not below the threshold, wherein the first level of detail is higher than the second level of detail.

6. The method of claim 1, further comprising:

displaying geographic markers on the first digital map when the viewport is at the initial position, wherein the geographic markers correspond to results of a geographic query limited to the first geographic area;

automatically re-executing, by the one or more processors, the geographic query limited to the second geographic area, in response to detecting the fling gesture and prior to the viewport reaching the target position;

storing results of the re-executed geographic query in the second memory along with the retrieved map data; and displaying second geographic markers on the second digital map when the viewport is at the target position, wherein the second geographic markers correspond to results of the geographic query limited to the second geographic area.

7. The method of claim 1, wherein determining the trajectory of the viewport includes using one or more of (i) a history of past user gestures and (ii) a history of past viewport trajectories.

8. The method of claim 1, wherein storing the map data in the second memory includes storing the map data in a cache of a rendering pipeline implemented in a graphics card.

9. The method of claim 1, wherein prefetching the map data from the first memory includes retrieving the map data from a network server via a communication network.

10. The method of claim 1, wherein determining the trajectory based on the kinematic quantities of the communicated motion includes determining how far the viewport will travel based on an acceleration communicated to the viewport.

11. The method of claim 1, wherein prefetching the map data includes retrieving a plurality of map tiles describing respective equal portions of the second digital map.

12. A computing device comprising:

a user interface configured to receive gesture input;

rendering hardware configured to generate graphics content via the user interface;

a non-transitory memory coupled to the rendering hardware; and processing hardware configured to:

cause the rendering hardware to display, via the user interface, a digital map when a viewport is at an initial position corresponding to a first geographic area, the viewport defining a currently visible portion of a digital map, in response to a fling gesture communicating motion to the viewport via the user interface in a certain direction and with a certain acceleration, determine a trajectory of the viewport from the initial position to a target position corresponding to a second geographic area, based on kinematic quantities of the communicated motion, wherein the trajectory includes a plurality of intermediate positions along a path between the initial position and the target position, prefetch map data for generating respective digital maps at one or more of the plurality of intermediate positions of the viewport along the trajectory prior to the viewport reaching the one or more positions, wherein the processing hardware is configured to display the prefetched map data for the second geographic area when the viewport has reached the target position, and transfer the map data to the memory, wherein the rendering hardware retrieves the map data from the memory when rendering the digital maps at the corresponding one or more positions of the viewport.

13. The computing device of claim 12, further comprising:

a graphics card, wherein the memory is a cache of the graphics card.

14. The computing device of claim 13, wherein the cache is a second memory, the computing device further comprising a first memory having a lower speed of access by the rendering hardware than the second memory; wherein the processing hardware is configured to transfer the map data to the second memory from the first memory.

15. The computing device of claim 12, wherein to prefetch the map data, the processing hardware is further configured to:

obtain first map data for displaying a digital map of the first geographic area, at a first level of detail, and obtain second map data for displaying respective digital maps in the viewport at a plurality of intermediate positions along the trajectory between the initial position and the target position, at a second level of detail, wherein the first level of detail is higher than the second level of detail.

16. The computing device of claim 12, wherein the processing hardware is configured to determine the trajectory of the viewport further in view of one or more of (i) past user gestures and (ii) a history of past viewport trajectories.

17. A system for rendering digital maps, the system comprising:

a user interface configured to receive gesture input;

rendering hardware;

processing hardware;

a first memory not directly accessible by the rendering hardware, wherein the first memory stores map data for rendering digital maps;

a second memory accessible by the rendering hardware; and wherein the processing hardware is configured to:

cause the rendering hardware to display, via the user interface, a first digital map when a viewport is at an initial position corresponding to a first geographic area, the viewport defining a currently visible portion of a digital map;

in response to a fling gesture communicating motion to the viewport via the user interface in a certain direction and with a certain acceleration, determine a trajectory of the viewport from the initial position to a target position corresponding to a second geographic area, based on kinematic quantities of the communicated motion, wherein the trajectory includes a plurality of intermediate positions along a path between the initial position and the target position;

transfer, from the first memory to the second memory, map data for generating a second digital map in the viewport at the target position, prior to the viewport reaching the target position, wherein the processing hardware is configured to display the retrieved map data for the second geographic area when the viewport has reached the target position, and when the viewport reaches the target position, cause the rendering hardware to display the second digital map using the map data in the second memory.

18. The system of claim 17, wherein the rendering hardware and the second memory are implemented in a graphics card.

19. The system of claim 17, wherein the first memory is implemented in a network server coupled to the processing hardware via a communication network.

* * * * *